United States Patent Office 3,354,990
Patented Nov. 28, 1967

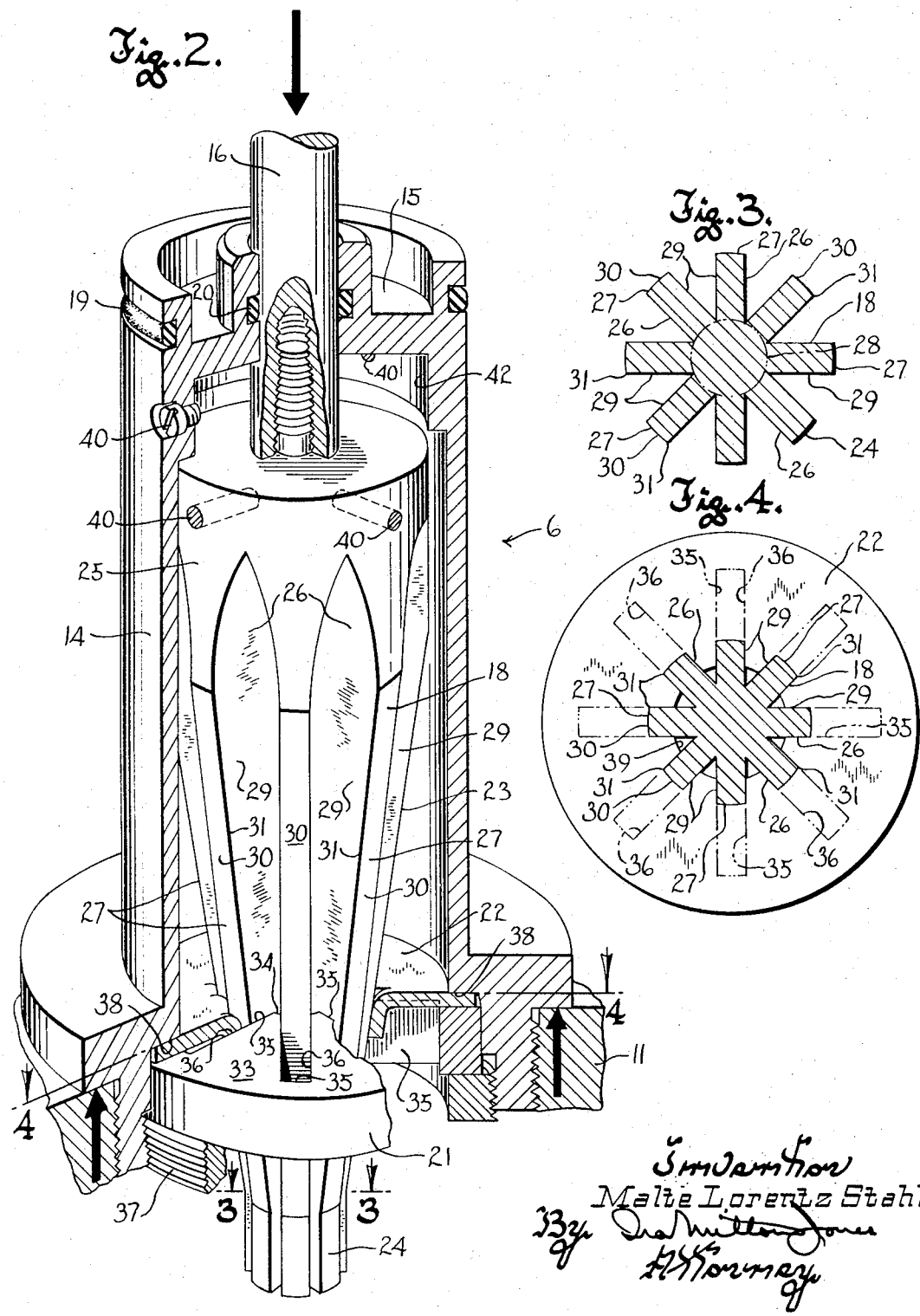

3,354,990
IMPACT ABSORBING DEVICE
Malte Lorentz Stahl, Linköping, Sweden, assignor to SAAB Aktiebolag, Linköping, Sweden, a corporation of Sweden
Filed Dec. 9, 1965, Ser. No. 512,735
Claims priority, application Sweden, Dec. 12, 1964, 15,498/64
4 Claims. (Cl. 188—1)

ABSTRACT OF THE DISCLOSURE

A pair of bodies that may be subjected to opposing load forces along a defined axis are respectively connected to a punch and to a die, and a shearable wall member is confined between the punch and the die. The punch is frustoconical in side view, and it is lengthwise fluted to define lands projecting radially from said axis and on which are shearing edges. The die has a top surface normal to said axis and slots opening to said surface that define cooperating shearing edges and receive the lands. The shearable wall member has its surfaces normal to the axis and is secured to the die for cooperation with the punch in preventing rebound following impact.

---

This invention relates to impact absorbing devices or crash dampers for cushioning the shock upon one of a pair of connected bodies due to an impact against the other body, and the invention pertains more particularly to an impact absorbing device of the type comprising a frangible element which is adapted to be destructively reshaped in consequence of an impact that produces large opposite load forces in connected bodies, and which frangible element, by its yielding, permits one of the bodies to move through a limited distance relative to the other while the reshaping of the frangible element absorbs energy from the relatively moving body and thus cushions shock to it.

It will be seen that the impact absorbing device or crash damper of this invention is of that class which is intended for one-time use, inasmuch as it is substantially destroyed by an impact which renders it operative, and thus it is intended to come into action only in catastrophic situations. Hence it is to be distinguished from a shock absorber which is intended to be effective through repeated impacts of relatively small force values. An example of an application in which an impact absorber of the type here contemplated has utility is in the mounting means by which an aircraft seat is secured in an aircraft, where the impact absorber serves to cushion such severe shocks to the seat occupant as might be encountered in a crash landing.

Heretofore there have been suggested two general types of impact absorbing devices incorporating frangible elements which are reshaped in consequence of an impact. In one of these, which is illustrated by Swedish Patent No. 128,340, published May 30, 1950, impact causes the frangible element to be plastically deformed, as by stretching or bending. In the other type of crash damper heretofore proposed, which is illustrated by French Patent No. 1,105,404, published Dec. 2, 1955, the frangible element is chipped in the course of shock responsive relative movement of the body to be cushioned. Each of those expedients, however, has serious disadvantages.

In devices where energy is dissipated in the plastic deformation of the frangible element, the rate of energy dissipation tends to vary widely through the range of travel of the shock protected body because of the fact that the relation between force and deformation of the part subjected to reshaping is not rectilinear within the range of plastic deformation. In devices wherein a chipping effect is relied upon for energy dissipation there is a possibility of the chipping edge being blunted or of the cooperating energy dissipating elements being otherwise deformed in consequence of a very severe impact, and this, together with the posibility of interference from the chips, can give rise to substantial variation in the force required to effect relative movement between the energy dissipating elements. A further important disadvantage of both of these prior devices is that after operating they do not serve to restrain relative motion in the direction opposite to that which they are intended to permit, so that a body which may have been cushioned and protected by the device through a severe initial impact shock in one direction is damaged or destroyed in consequence of relative motion during a secondary or rebound impact of substantially lesser magnitude but in the opposite direction.

By contrast with these prior expedients it is a general object of the present invention to provide an impact absorbing device or crash damper of the character described having means cooperating with a frangible element to effect a progressive shearing of the frangible element all during the course of relative motion between two bodies with which the device is connected, so that energy is absorbed from the cushioned body at a substantially constant rate throughout its relative motion.

Another important general object of this invention is to provide an impact absorbing device which is simple and inexpensive in construction, light in weight, compact, and dependable, and which, after it has been actuated, substantially inhibits relative motion in the direction opposite that which it is intended to permit.

It is a more specific object of the invention to provide an impact absorber of the character described for permitting a pair of connected bodies to have limited relative motion in response to opposite loads on them in excess of a predetermined force, as when one of the bodies is subjected to an impact, in order to cushion shock to the other body, which impact absorber comprises a frangible element in the nature of a homogeneous wall and a pair of cooperating opposed shearing elements, each of said shearing elements being connected with one of said bodies to be moved toward the other shearing element in consequence of load produced relative motion between the bodies, and each having shearing edge portions facing the other and engaging the wall element, said shearing edge portions being so arranged as to cooperate in effecting progressive shearing of the wall element during motion of the shearing elements toward one another.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of a physical embodiment of the invention constructed according to the best mode so far devised for the practical application of the principles thereof, and in which:

FIGURE 2 is a longitudinal sectional view of the impact absorber on an enlarged scale;

FIGURE 3 is a horizontal sectional view taken on the plane of the line 3—3 in FIGURE 2; and FIGURE 4 is a horizontal sectional view taken on the plane of the line 4—4 in FIGURE 2.

Figure 1:
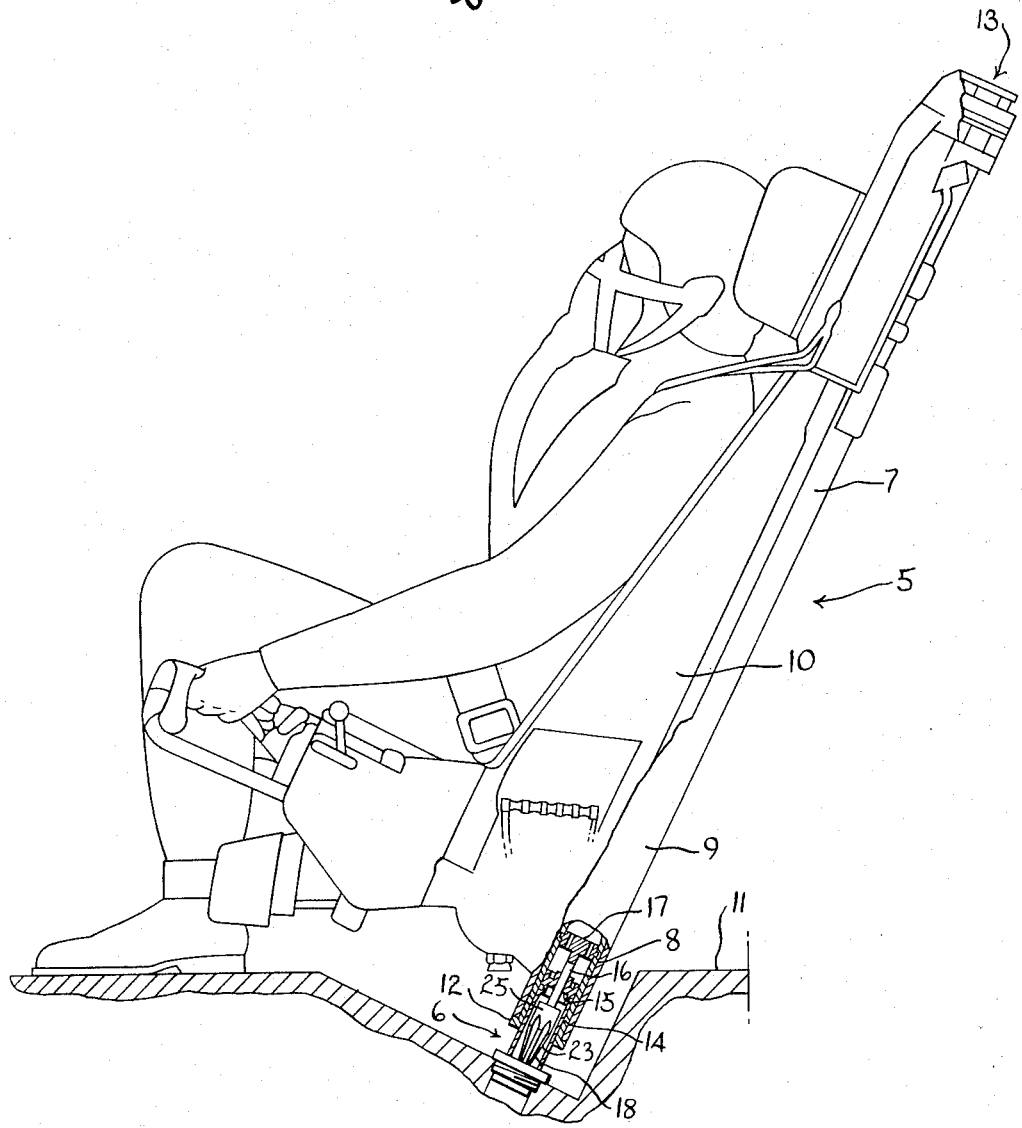
FIGURE 1 is a view in side elevation, but with portions broken away, of an aircraft ejection seat incorporating an impact absorber which embodies the principles of this invention.

Referring now to the accompanying drawings, the numeral 5 designates generally an aircraft ejection seat in which an impact absorber 6 embodying the principles of this invention is incorporated, as an example of a typical application of the impact absorber. The ejection seat 5 is arranged to be ejected from an aircraft by means of a generally conventional ejection gun 7 comprising telescoping substantially upright inner and outer tubes 8 and 9 which are adapted to be forcefully propelled axially apart by the detonation of an explosive charge (not shown). The seat pan of the ejection seat, designated by 10, is secured to the outer telescoping tube 9 of the ejection gun, while the inner tube 8 of the gun is connected at its lower end to aircraft structure 11 through the impact absorber 6. Upon ejection, the outer tube 9, the seat pan 10 and the seat occupant are propelled upwardly with respect to the inner tube 8, which remains in the aircraft.

The purpose of the impact absorber is to cushion the shock to the seat occupant that results, for example, from a wheels-up crash landing; and to that end the device permits the seat 10 and its occupant to move downwardly through a limited distance relative to the aircraft structure 11, absorbing the momentum energy of the seat and occupant in the course of such relative motion. As more fully explained in my copending application, Ser. No. 512,669, filed Dec. 9, 1965, the impact absorber does not yield under the reaction force of seat ejection, but yields only to a relatively downward load on the outer tube 9 that is in excess of a predetermined magnitude.

Relative downward load forces upon the outer tube 9 are normally transferred to the inner tube 8 through a circumferential flange or shoulder 12 on the bottom of the inner tube 8, upon which the lower end of the outer tube rests. Inadvertent upward motion of the outer tube 9 relative to the inner tube 8 is prevented by known type of locking mechanism 13 at the top of the gun that is released immediately prior to seat ejection and in the course of preparation for ejection.

The lower end portion of the inner tube 8 of the ejection gun is telescoped over a cylindrical tube 14 which comprises a relatively fixed part of the aircraft structure 11. Normally the bottom of the inner tube 8 is spaced a substantial distance above the bottom of the fixed tube 14, but during crash damping the tube 8 slides downwardly along the fixed tube 14. At its top the fixed tube 14 has an annular wall 15 which forms a bottom closure for the inner tube 8 and which also provides a bearing for a coaxial push rod 16 that connects the inner tube with the impact absorber 6.

A suitable annular seal 19 is confined between the outer circumference of the annular wall 15 and the inner surface of the inner tube 8, and there is a similar sealing ring 20 between the inner circumference of the wall 15 and the push rod 16.

The push rod 16 is connected at its upper end, above the wall 15, with an apertured bulkhead 17 that is anchored to the inner tube 8 near the lower end thereof, as more fully described in our aforesaid copending application; and the lower end of the push rod, which is beneath the wall 15, is connected with the relatively movable element 18 of the impact absorber. The impact absorber yields to permit downward relative motion of the seat pan through a limited distance when the opposing loads on the movable element 18 and on the relatively fixed structure comprising the cylindrical tube 14 produce a force that exceeds a predetermined value, such as 15g, which is safely below that at which injury to a seat occupant can be expected.

The movable element 18 of the impact absorber constitutes a punch which cooperates with a die element 21 that is fixed to the aircraft structure 11. A homogeneous wall element 22 that overlies the die element is progressively sheared by cooperation of the die and the punch as the punch descends relative to the die.

As shown, the movable element or punch of the impact absorber is symmetrical about the axis of the cylindrical tube 14 and the push rod 16. It has a generally frusto-conical midsection 23 which tapers downwardly to a small diameter cylindrical bottom portion 24 and diverges upwardly to a larger diameter cylindrical top portion 25 that is normally received with a more or less close fit in a reduced diameter bore portion 42 at the top of the tube 14. The frustoconical midsection 23 of the punch has a plurality of lengthwise extending grooves 26 which are V-shaped as viewed from either end of the punch and which preferably continue through its small diameter cylindrical bottom portion 24. These grooves define axially extending lands or ridges 27 that project radially from a central core portion 28 which is of uniform radius along the length of the punch. The lands or ridges of course taper in their radial dimensions toward the bottom of the punch, due to the generally frustoconical shape of its midsection.

Each of the lands is symmetrical with respect to a plane lying on the punch axis, and has its side surfaces 29 parallel to and equidistant from said plane. The side surfaces 29 of each land meet the outer circumferential surface 30 of the punch at sharply square corners 31 which of course define the shearing edges of the punch. Note that these shearing edges, by reason of their lengthwise oblique inclination to the axis of the punch, are arranged to effect a progressive radially outward shearing action as the punch moves downwardly relative to the die element 21 and the wall element 22.

The die element has a flat upper surface 33 which is normal to the punch axis and which the wall element 22 flatwise overlies, and has a central aperture 34 that is large enough to receive the core portion 28 of the punch. The die element also has slots 35 that extend radially from its central aperture and which are of such size and shape as to closely receive the ridges or lands 27 on the punch and are of sufficient depth (measured radially) to permit the punch to descend in the die to the maximum diameter portion of the punch. The side surfaces of the slots 35 in the die of course meet its top surface at sharp, square corners 36 which provide shearing edges that oppose and cooperate with the shearing edges 31 on the punch.

By means of a clamping ring 37 threaded into the lower end portion of the cylindrical tube 14, the die element, and the wall element overlying it, are clamped against a seat 38 defined by a downwardly facing circumferential shoulder formed on said tube just above its bottom, and the die element and wall element are thereby secured in fixed relation to the tube 14.

The wall element 22, which has substantially flat, parallel upper and lower faces, has a central aperture 39 that is just large enough to receive the small diameter cylindrical bottom portion 24 of the punch, which normally projects downwardly through said aperture 39 and into the central aperture 34 in the die, to allow the outer circumferential surfaces 30 of the punch to abut against the edge of the aperture 39 in the wall element. Normally, too, the punch is held against downward motion relative to the fixed cylindrical tube 14 by means of frangible screws 40 which extend radially through clearance holes in the upper portion of the tube 14 and are threaded into the cylindrical top portion 25 of the punch.

However, in the presence of sufficiently large opposing loads on the punch and die, the frangible screws 40 are sheared, permitting the punch to descend, and the shearing edges 31 on the punch cooperate with the shearing edges 36 on the die to shear slots in the wall element and thus give it a shape which substantially corresponds to that of the die. This shearing action, as pointed out above, takes place all during relative descent of the punch, owing to the oblique lengthwise inclination of the shearing edge portions 31 on the punch; hence all during punch descent the cooperating punch, die and wall members are dissipating energy at a substantially uniform rate in the production of this shearing effect. It will also be observed that the square-cornered shearing edge portions of the punch and die are inherently sturdy and well adapted to resist blunting or other deformation under load force produced impacts.

It will of course be understood that the wall element is so selected as to be sheared only under a force of predetermined value, which value can be varied by changing the thickness of the wall element, the material of which it is made, and/or the number of shearing lands on the punch.

After impact, friction between the sheared wall element and the punch restrains the punch against relative upward movement. It has been found that this friction is sufficiently great to withstand an upward mass load 6g from the ejection seat and its occupant, which is substantially larger than any upward force that can be expected after an impact that actuates the impact absorber.

From the foregoing description taken together with the accompanying drawings it will be apparent that this invention provides a very dependable impact damper which provides for limited motion between a pair of connected bodies when opposing loads on them exceed a predetermined force, and which produces a progressive shearing action all during such relative motion to absorb energy from the bodies and dissipate it at a substantially uniform rate.

What is claimed as my invention is:

1. Impact absorbing means connected between two bodies that may be subjected to opposing load forces exerted along a defined axis, for permitting one of said bodies to have limited motion relative to the other along said axis when said load forces exceed a predetermined value and for dissipating energy from said one body during the course of such motion, said impact absorbing means comprising:
    (A) a pair of cooperating shearing elements, one for each of said bodies, each so connected with its body that load force on the body tends to move the shearing element along said axis toward the other shearing element,
        (1) one of said shearing elements comprising a punch having lands projecting radially with respect to said axis, the outermost surfaces of said lands being oblique to said axis and defining shearing edges, and
        (2) the other of said shearing elements comprising a die having a surface that is substantially normal to said axis and having slots therein which extend radially to said axis and interrupt said surface to define shearing edges cooperable with said shearing edges on the punch, the lands on the punch being closely receivable in said slots; and
    (B) a homogeneous wall member confined between the shearing edge portions of the shearing elements and having sufficient strength in shear to be capable of resisting their shearing effect when opposing load forces upon said bodies are below said predetermined value but yieldable in shear when said load forces exceed said value.

2. The impact absorbing means of claim 1, further characterized by:
    means securing the wall member to the die so that the wall member can frictionally cooperate with the punch in resisting rebound of the shearing elements after they have sheared the wall member.

3. Impact absorbing means connected between two bodies that may be subjected to opposing load forces exerted along a defined axis, said impact absorbing means being of the type comprising a pair of cooperating shearing elements, each connected with one of said bodies to be moved thereby toward the other element in response to load forces on its body and each of said shearing elements having shearing edges opposing and cooperable with the shearing edges on the other, and a homogeneous shearable member normally interposed between said elements but adapted to be sheared by them when opposing load forces upon said bodies along said axis exceed a predetermined value, to thus absorb energy from one of said bodies while permitting it to have limited motion relative to the other, said impact absorbing means being characterized by:
    (A) one of said shearing elements having a portion that projects radially with respect to said axis and has a pair of surfaces that are substantially parallel to one another and to said axis, and another surface that extends obliquely to said axis and intersects said parallel surfaces to define the shearing edges on said one element;
    (B) said shearable member having a surface disposed substantially transversely to said axis so that during shearing thereof said portion of said one shearing element has steadily increasing engagement of its parallel surfaces with the shearable member; and
    (C) the other of said shearing elements having a slot that defines the shearing surfaces thereon and in which said portion on the first mentioned shearing element is closely receivable.

4. The impact absorbing means of claim 3, further characterized by:
    the shearable member being secured to said other of the shearing elements, to enable the shearable member to cooperate with the first designated shearing element in preventing rebound between the bodies after shearing of the shearable member has been effected in consequence of the imposition upon them of opposing load forces in excess of said predetermined value.

References Cited

FOREIGN PATENTS 905,836  9/1962  Great Britain.

DUANE A. REGER, *Primary Examiner.*